United States Patent
Lee et al.

(10) Patent No.: US 10,374,674 B2
(45) Date of Patent: Aug. 6, 2019

(54) METHOD FOR CONTROLLING ANTENNA AND ELECTRONIC DEVICE USING THE SAME

(71) Applicant: Samsung Electronics Co., Ltd., Gyeonggi-do (KR)

(72) Inventors: Hyoungjoo Lee, Gyeonggi-do (KR); Chaiman Lim, Seoul (KR); Dooyoung Kim, Gyeonggi-do (KR); Sung-Soo Kim, Gyeonggi-do (KR); Min-Chull Paik, Gyeonggi-do (KR); Yongjun An, Gyeonggi-do (KR); Sangyun Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/622,249

(22) Filed: Jun. 14, 2017

(65) Prior Publication Data
US 2017/0359113 A1 Dec. 14, 2017

(30) Foreign Application Priority Data
Jun. 14, 2016 (KR) .................. 10-2016-0073907

(51) Int. Cl.
*H04B 1/00* (2006.01)
*H04B 7/06* (2006.01)
(Continued)

(52) U.S. Cl.
CPC .......... *H04B 7/061* (2013.01); *H04B 7/0417* (2013.01); *H04B 17/15* (2015.01); *H04B 17/29* (2015.01);
(Continued)

(58) Field of Classification Search
CPC .......... H04B 7/06; H04B 17/15; H04B 17/29; H04B 17/318; H04B 17/336; H04B 7/0417
(Continued)

(56) References Cited

U.S. PATENT DOCUMENTS 7,181,246 B2 * 2/2007 Lo ................. H01Q 3/2605
370/252
9,379,788 B2 * 6/2016 Clevorn ................. H04B 7/04
(Continued)

FOREIGN PATENT DOCUMENTS

KR    10-2012-0135812 A    12/2012

OTHER PUBLICATIONS

Sanayei, "Antenna Selection in MIMO Systems", IEEE, 2004.*

*Primary Examiner* — Edward F Urban
*Assistant Examiner* — Max Mathew
(74) *Attorney, Agent, or Firm* — Cha & Reiter, LLC

(57) ABSTRACT

Various embodiments of the present disclosure relate to a device and a method for controlling a plurality of antennas in an electronic device. The electronic device may include: a plurality of antennas; a communication circuit configured to be connected with the plurality of antennas; and at least one processor, wherein the processor may be configured to: transmit a signal to an external device through one antenna among the plurality of antennas; detect a difference in reception performance between the antenna and each of at least one remaining antenna in response to occurrence of an event; and set one among the plurality of antennas as a transmitting antenna for the electronic device based on a threshold corresponding to an antenna characteristic of each of the at least one remaining antenna and the difference in reception performance. Other embodiments are possible.

17 Claims, 12 Drawing Sheets

(51) Int. Cl.
*H04B 17/15* (2015.01)
*H04B 17/29* (2015.01)
*H04B 17/318* (2015.01)
*H04B 17/336* (2015.01)
*H04B 7/0417* (2017.01)

(52) U.S. Cl.
CPC ......... *H04B 17/318* (2015.01); *H04B 17/336* (2015.01)

(58) Field of Classification Search
USPC ...................................... 455/63.4, 63.1, 63.3
See application file for complete search history.

(56) References Cited

U.S. PATENT DOCUMENTS

| | | | | |
|---|---|---|---|---|
| 2008/0174488 | A1* | 7/2008 | Weinstein | H01Q 1/362 342/377 |
| 2008/0311871 | A1* | 12/2008 | Qi | H04B 17/29 455/226.2 |
| 2010/0009635 | A1* | 1/2010 | Qin | H01Q 3/267 455/63.4 |
| 2010/0150265 | A1* | 6/2010 | Wu | H04B 7/061 375/296 |
| 2010/0316154 | A1* | 12/2010 | Park | H04B 7/063 375/267 |
| 2012/0275506 | A1* | 11/2012 | Ding | H04W 24/06 375/224 |
| 2012/0315851 | A1 | 12/2012 | Park | |
| 2013/0005280 | A1* | 1/2013 | Leung | G01S 7/023 455/90.1 |
| 2014/0169243 | A1* | 6/2014 | Khlat | H04B 7/0602 370/297 |
| 2015/0236544 | A1* | 8/2015 | Uchida | H02J 50/12 343/860 |
| 2015/0326261 | A1* | 11/2015 | Paik | H04B 15/04 455/234.2 |
| 2015/0372656 | A1 | 12/2015 | Mow et al. | |
| 2017/0359113 | A1* | 12/2017 | Lee | H04B 17/15 |
| 2018/0062718 | A1* | 3/2018 | Clevorn | H04B 7/04 |

* cited by examiner

METHOD FOR CONTROLLING ANTENNA AND ELECTRONIC DEVICE USING THE SAME

CLAIM OF PRIORITY

This application claims the priority under 35 U.S.C. § 119(a) to Korean Application Serial No. 10-2016-0073907, which was filed in the Korean Intellectual Property Office on Jun. 14, 2016, the entire contents of which are hereby incorporated by reference.

TECHNICAL FIELD

Various embodiments of the present disclosure relate to a device and a method for controlling a plurality of antennas in an electronic device.

BACKGROUND

With the increasing use of electronic devices and improved utilization of wireless communication technology due to the development of information and communication technology and semiconductor technology, traffic via electronic devices has been increasing.

As traffic increases, electronic devices may employ a variety of technologies to increase wireless communication speed. For example, an electronic device may use a multi-antenna transmission mode (for example, Multiple Input Multiple Output (MIMO)) that uses a plurality of antennas to enhance data transmission speed and reliability in data transmission.

SUMMARY

An electronic device including a plurality of antennas may set a main antenna for transmission and reception operations of the electronic device and a sub-antenna for a reception operation of the electronic device in each frequency band.

The electronic device may change operations of the main antenna and the sub-antenna in order to improve the transmission performance of the electronic device. For example, when the transmission performance using the main antenna does not satisfy a threshold performance in a specific frequency band, the electronic device may change the operations of the antennas such that the sub-antenna is used to perform the transmission and reception operations and the main antenna is used to perform the reception operation of the electronic device.

Accordingly, even though the electronic device includes the plurality of antennas, the electronic device changes only the operations of the main antenna and the sub-antenna allocated to the specific frequency band, and thus the utilization of the plurality of antennas declines.

Various embodiments of the present disclosure may provide a device and a method for configuring a transmitting antenna in an electronic device including a plurality of antennas.

According to various embodiments of the present disclosure, an electronic device may include: a plurality of antennas; a communication circuit configured to be connected with the plurality of antennas; and at least one processor, wherein the processor may be configured to: control the communication circuit to transmit a signal to an external device through one antenna among the plurality of antennas; detect a difference in reception performance between the antenna and each of at least one remaining antenna in response to occurrence of an event; and set one among the plurality of antennas as a transmitting antenna for the electronic device based on a threshold corresponding to an antenna characteristic of each of the at least one remaining antenna and the difference in reception performance.

According to various embodiments of the present disclosure, an operating method of an electronic device may include: transmitting a signal to an external device through one antenna among a plurality of antennas functionally connected to the electronic device; detecting a difference in reception performance between the antenna and each of at least one remaining antenna in response to occurrence of an event; and setting one antenna among the plurality of antennas as a transmitting antenna for the electronic device based on a threshold corresponding to an antenna characteristic of each of the at least one remaining antenna and the difference in reception performance.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1A:
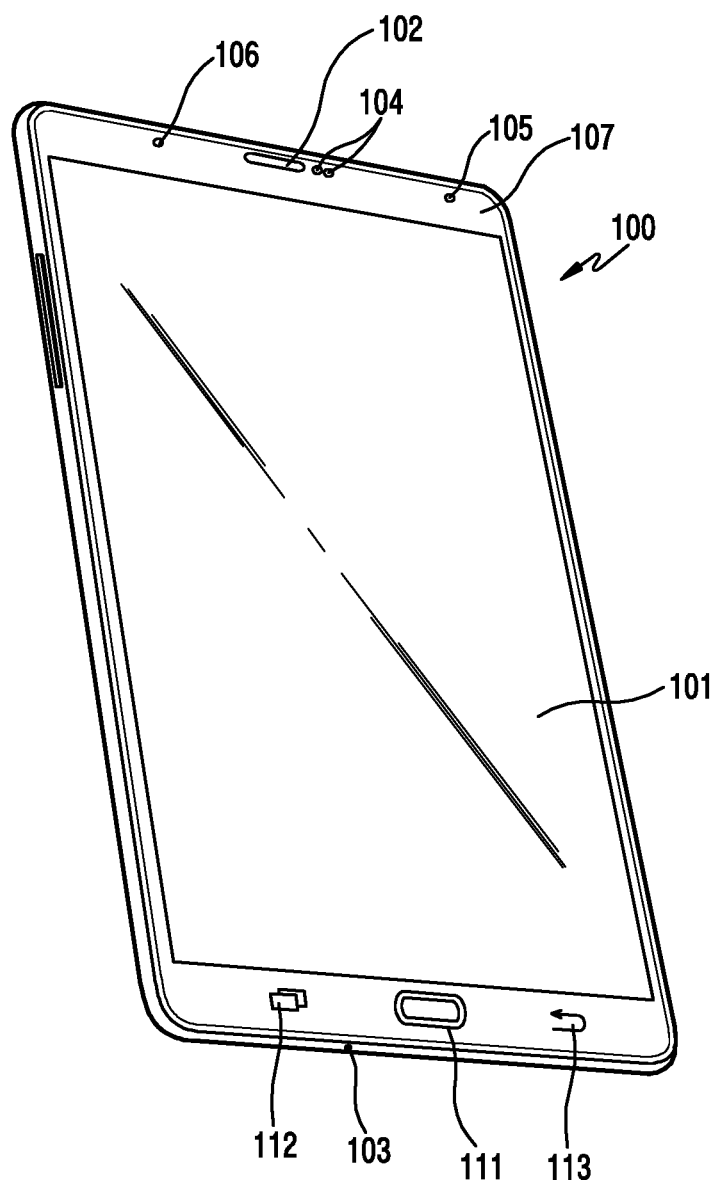
FIG. 1A is a perspective view of an electronic device according to various embodiments of the present disclosure.

Hereinafter, various embodiments of the present document are described with reference to the accompanying drawings. It should be understood, however, that it is not intended to limit the various embodiments of the present document to the particular form disclosed, but, on the contrary, it is intended to cover all modifications, equivalents, and alternatives falling within the spirit and scope of the various embodiments of the present document. Like reference numerals denote like components throughout the drawings. A singular expression includes a plural concept unless there is a contextually distinctive difference therebetween.

In the present document, an expression "A or B", "A and/or B", or the like may include all possible combinations of items enumerated together. Although expressions such as "$1^{st}$", "$2^{nd}$", "first", and "second" may be used to express corresponding constitutional elements, it is not intended to limit the corresponding constitutional elements. When a certain (e.g., $1^{st}$) constitutional element is mentioned as being "operatively or communicatively coupled with/to" or "connected to" a different (e.g., $2^{nd}$) constitutional element, the certain constitutional element is directly coupled with/to another constitutional element or can be coupled with/to the different constitutional element via another (e.g., $3^{rd}$) constitutional element.

An expression "configured to" used in the present document may be interchangeably used with, for example, "suitable for", "having the capacity to", "adapted to", "made to", "capable of", or "designed to" in a hardware or software manner according to a situation. In a certain situation, an expressed "a device configured to" may imply that the device is "capable of" together with other devices or components. For example, "a processor configured to perform A, B, and C" may imply a dedicated processor (e.g., an embedded processor) for performing a corresponding operation or a generic-purpose processor (e.g., Central Processing Unit (CPU) or an application processor) capable of performing corresponding operations by executing one or more software programs stored in a memory device.

An electronic device according to various embodiments of the present disclosure, for example, may include at least one of a smartphone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), an MP3 player, a mobile medical appliance, a camera, and a wearable device (e.g., smart glasses, a head-mounted-device (HMD), electronic clothes, an electronic bracelet, an electronic necklace, an electronic accessory, an electronic tattoo, a smart mirror, or a smart watch).

According to some embodiments, the electronic device (ex. home appliance) may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR) , a Flight Data Recorder (FDR) , a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

In the following description, an up/down antenna switch may refer to an antenna switch mode for switching an operating mode of antennas (for example, a main antenna and a sub-antenna) disposed in different areas of an electronic device (for example, at the top and bottom of the electronic device). For example, a main antenna may refer to a reference antenna configured to transmit and receive a signal in a corresponding frequency band, and a sub-antenna may refer to a reference antenna configured to receive a signal in the corresponding frequency band.

In the following description, a left/right antenna switch may refer to an antenna switch mode for switching an operating frequency band of antennas disposed in the same area of an electronic device (for example, at the top or bottom of the electronic device).

FIG. 1A is a perspective view of an electronic device according to various embodiments of the present disclosure.

Referring to FIG. 1A, a display 101 may be installed on a front surface 107 of the electronic device 100.

According to one embodiment, a speaker device 102 to receive a counterpart's voice may be disposed above the display 101. A microphone device 103 to transmit a voice of a user of the electronic device may be disposed below the display 101.

According to one embodiment, at least one sensor 104 may be provided near the speaker device 102. For example, the sensor 104 may include at least one of an illumination sensor (for example, an optical sensor), a proximity sensor, an infrared sensor, and an ultrasonic sensor.

According to one embodiment, a camera 105 may be provided near the speaker 102. In addition, an indicator 106, such as a light, to indicate state information on the electronic device 100 to the user may be provided near the speaker device 102.

According to one embodiment, buttons 111, 112, and 113 to detect a user input may be provided below the display 101. For example, a first button 111 may be configured as a hardware button, and a second button 112 and a third button 113 may be configured as a touch pad. For example, the buttons 111, 112, and 113 to detect a user input may be configured to be part of a touch pad or touch screen.

The electronic device 100 can be capable of wirelessly communication with other wireless devices or a network using a plurality of antennas.

Figure 1B:
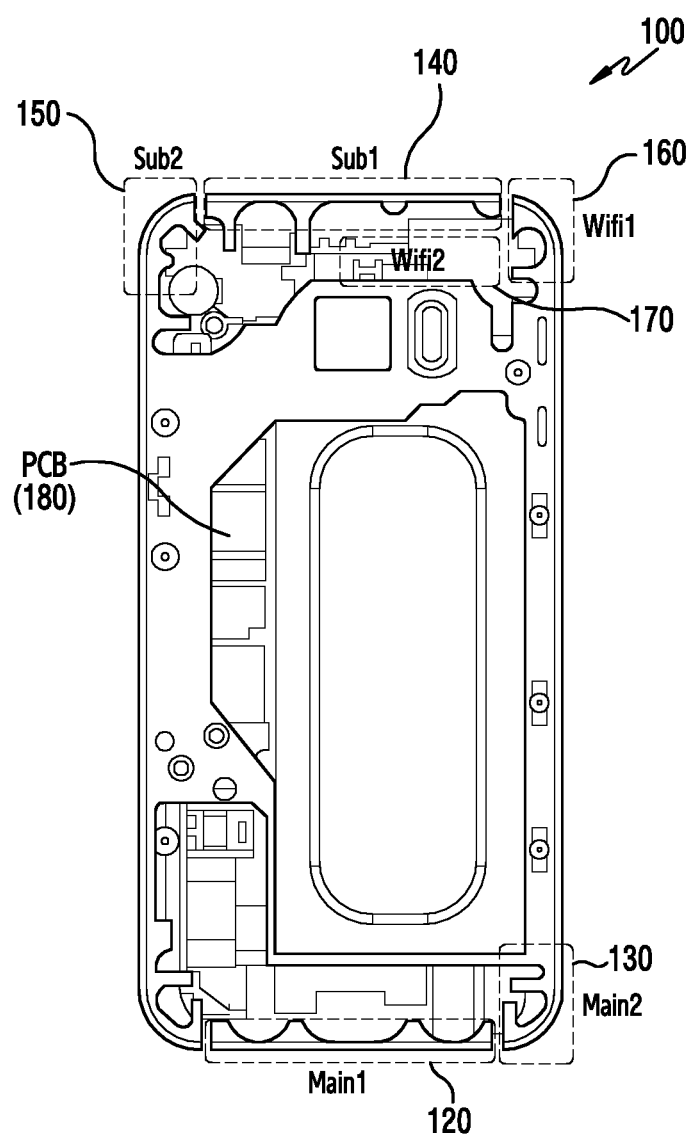
FIG. 1B illustrates an antenna arrangement of the electronic device according to various embodiments of the present disclosure.

FIG. 1B illustrates an antenna arrangement of the electronic device according to various embodiments of the present disclosure.

Referring to FIG. 1B, the electronic device 100 may include at least one of a plurality of antennas 120 to 170. For example, the plurality of antennas 120 to 170 may be disposed above or below a Printed Circuit Board (PCB) 180 of the electronic device 100.

According to one embodiment, a first antenna 120 and a second antenna 130 may include a main antenna to transmit and receive a signal for a voice service or data service. For example, the first antenna 120 and the second antenna 130 may be disposed in a first area of the electronic device 100 (for example, a lower area of the electronic device).

For example, the first antenna 120 may transmit and receive a signal in a middle frequency band (for example, 1700 MHz to 2100 MHz) or a low frequency band (for example, 700 MHz to 900 MHz). The second antenna 130 may transmit and receive a signal in a high frequency band (for example, 2300 MHz to 2700 MHz) or the middle frequency band. For example, the first antenna 120 and the second antenna 130 may be physically or logically separated.

According to one embodiment, a third antenna 140 to a sixth antenna 170 may include a sub-antenna to receive a signal for a voice service or data service. For example, the third antenna 140 to the sixth antenna 170 may be disposed in a second area of the electronic device 100 (for example, an upper area of the electronic device). For example, the third antenna 140 may receive a signal in the middle frequency band or low frequency band. A fourth antenna 150 may receive a signal in the high frequency band or middle frequency band. In addition, the fourth antenna 150 may receive a satellite signal. A fifth antenna 160 and the sixth antenna 170 may transmit and receive a signal for a wireless local area network (LAN, for example, Wi-Fi). For example, the third antenna 140 and the fourth antenna 150 may be physically or logically separated.

The antennas and frequencies are summarized in the table below:

Antenna No. Freq. Band Range
1$^{st}$ (120) 1700-2100 MHz Middle
700-900 MHz Low
2$^{nd}$ (130) 2300-2700 MHz High
1700-2100 MHz Middle
3$^{rd}$ (140) 1700-2100 MHz Middle
700-900 MHz Low
4$^{th}$ (150) 2300-2700 MHz High
1700-2100 MHz Middle
Satellite
5$^{th}$ WLAN/Wi-Fi
6$^{th}$ WLAN/Wi-Fi According to various embodiments of the present disclosure, the electronic device 100 may have the third antenna 140 and the fourth antenna 150 disposed in the first area and may have the first antenna 120 and the second antenna 130 disposed in the second area.

According to various embodiments of the present disclosure, the electronic device 100 may have the first antenna 120 and the second antenna 130 disposed on a first lateral side of the electronic device 100 and may have the third antenna 140 and the fourth antenna 150 disposed on a second lateral side.

Figure 2:
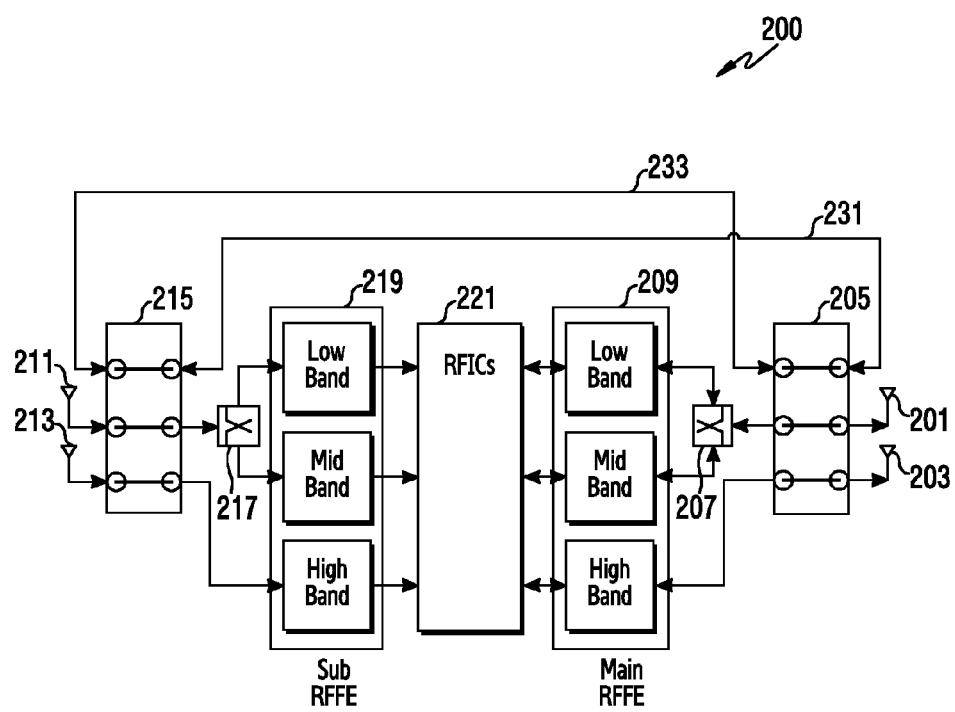
FIG. 2 illustrates an example of an antenna connection in an electronic device according to various embodiments of the present disclosure.

FIG. 2 illustrates an example of an antenna connection in an electronic device according to various embodiments of the present disclosure. In the following description, the electronic device 200 may include the whole or part of the electronic device 100 in FIG. 1A and FIG. 1B. For example, a first antenna 201 and a second antenna 203 may include the first antenna 120 and the second antenna 130 in FIG. 1B. A third antenna 211 and a fourth antenna 213 may include the third antenna 140 and the fourth antenna 150 in FIG. 1B.

Referring to FIG. 2, the electronic device 200 may include: a plurality of antennas 201, 203, 211, and 213; a plurality of switches 205 and 215, a plurality of diplexers 207 and 217; a plurality of Radio Frequency Front End (RFFE) modules 209 and 219; and an RF Integrated Circuit (RFIC) module 221.

According to one embodiment, the plurality of antennas 201, 203, 211, and 213 may include the first antenna 201 and the second antenna 203, which are disposed in a first area of the electronic device 200 (for example, a lower area of the electronic device 100), and the third antenna 211 and the fourth antenna 213, which are disposed in a second area (for example, an upper area of the electronic device 100).

For example, the first antenna 201 and the second antenna 203 may be configured as a main antenna to transmit and receive a signal in a corresponding frequency band (e.g., first antenna 201 for the middle and low ranges, and second antenna 203 for the high and middle ranges), and the third antenna 211 and the fourth antenna 213 may be configured as a sub-antenna to receive a signal in the corresponding frequency band (e.g., third antenna 211 for the middle and low ranges, and fourth antenna 213 for the high and middle ranges). For example, the first antenna 201 and the second antenna 203, which are disposed in the first area, may include an antenna impedance tuner for impedance tuning.

According to one embodiment, the switches 205 and 215 may switch a connection between the plurality of antennas 201, 203, 211, and 213 and a communication circuit (for example, the diplexers 207 and 217, the RFFE modules 209 and 219, and the RFIC module 221) of the electronic device 200 using a first path 231 (first electrical path) and a second path 233 (second electrical path) that connect a first switch 205 and a second switch 215. For example, the switch 205 or 215 is an x pole y throw (xPyT) type and may include one more pole and throw than the number of antennas disposed in a corresponding area (for example, the first area or the second area) to be connected with another switch 215 or 205. For example, when two antennas 201 and 203 are disposed in an area (for example, the first area) where the first switch 205 is disposed, the first switch 205 may be configured as a 3P3T switch. Switch 205 can have antennas 201 and 203 connected to different poles, while one throw is connected to diplexer 207 and another throw is connected to the high band portion of Main RFFE 209. For example, when two antennas 211 and 213 are disposed in an area (for example, the second area) where the second switch 215 is disposed, the second switch 215 may be configured as a 3P3T switch. Switch 215 can have antennas 211 and 213 connected to different poles, while one throw is connected to diplexer 217 and another throw is connected to the high band portion of Main RFFE 219. For example, when three antennas are disposed in the first area, the first switch 205 may be configured as a 4P4T switch. When one antenna is disposed in the second area, the second switch 215 may be configured as a 2P2T switch. For example, the first path 231 and the second path 233 may be configured as a coaxial cable, a Flexible PCB (FPCB) type, or a PCB internal path. The additional pole and throw of switches 205 and 215 are for electrical paths 231 and 233. Electrical path 231 is connected to the additional pole of switch 205 and the throw of switch 215. Electrical path 233 is connected to the addition pole of switch 215 and the throw of switch 205.

According to one embodiment, the switches 205 and 215 may switch a connection between the plurality of antennas 201, 203, 211, and 213 and an internal element of the electronic device 200 based on control by the RFIC module 221 or a processor (for example, an AP or CP) of the electronic device 200. For example, the switches 205 and 215 may switch a connection between the plurality of antennas 201, 203, 211, and 213 and an internal element of the electronic device 200 using the first path 231 and the second path 233 to correspond to an up/down antenna switch (antennas 120 and 130 versus antennas 140 and 150), a left/right antenna switch (antenna 120 versus antenna 130), and a diagonal antenna switch (antennas 120 versus antenna 150).

According to one embodiment, the diplexer 207 or 217 may be used to transmit or receive signals in the low frequency band and the medium frequency band through one antenna. For example, a first diplexer 207 may be used to transmit and receive signals in the low frequency band and the medium frequency band through one of the plurality of antennas 201, 203, 211, and 213. For example, the second diplexer 217 may be used to receive signals in the low frequency band and the medium frequency band through one of the plurality of antennas 201, 203, 211, and 213.

According to one embodiment, a main RFFE module 209 may process a signal, which is transmitted and received through one of the plurality of antennas 201, 203, 211, and 213, by the frequency band of the signal. For example, the main RFFE module 209 may include a Power Amplifier Module (PAM), a switch, or duplexers. For example, the PAM may amplify the power of a signal to be transmitted through an antenna so that the signal is transmitted to another electronic device through a wireless environment. The switch may connect a duplexer that is suitable for a frequency band of the signal transmitted and received through the antenna and the PAM.

According to one embodiment, a sub-RFFE module 219 may process a signal, which is received through one of the plurality of antennas 201, 203, 211, and 213, by the frequency band of the signal. For example, the sub-RFFE module 219 may include a Low Noise Amplifier (LNA), a band pass filter, or a switch. For example, the LAN may amplify a signal received through an antenna to compensate for a loss in signal strength that occurs until the received signal reaches the RFIC module 221. The switch may connect a band pass filter that is suitable for the signal received through the antenna and the LAN.

According to one embodiment, the RFIC module 221 may process signals transmitted and received through the antennas 201, 203, 211, and 213. For example, the RFIC module 221 may convert an RF signal, which is received through the antennas 201, 203, 211, and 213, into a baseband signal. The RFIC module 221 may convert a baseband signal, which is transmitted through the antennas 201, 203, 211, and 213, into an RF signal.

Figure 3:
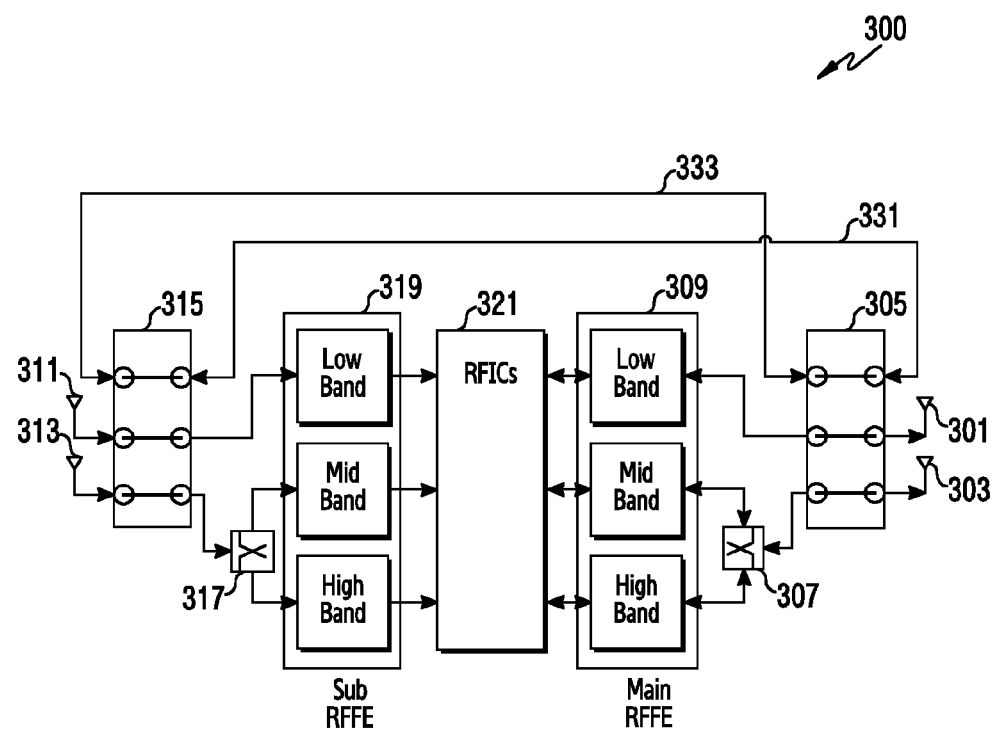
FIG. 3 illustrates another example of an antenna connection in an electronic device according to various embodiments of the present disclosure.

FIG. 3 illustrates another example of an antenna connection in an electronic device according to various embodiments of the present disclosure. In the following description, the electronic device 300 may include the whole or part of the electronic device 100 in FIG. 1A and FIG. 1B. For example, a first antenna 301 and a second antenna 303 may include the first antenna 120 and the second antenna 130 in FIG. 1B. A third antenna 311 and a fourth antenna 313 may include the third antenna 140 and the fourth antenna 150 in FIG. 1B. In FIG. 3, diplexers 307 and 317 multiplex frequency signals in the mid and high frequency bands, whereas in FIG. 2, diplexers 207 and 217 multiplexed frequency signals in the low and mid bands.

Referring to FIG. 3, the electronic device 300 may include: a plurality of antennas 301, 303, 311, and 313; a plurality of switches 305 and 315; a plurality of diplexers 307 and 317; a plurality of RFFE modules 309 and 319; and an RFIC module 321. In the following description, the antennas 301, 303, 311, and 313, the switches 305 and 315, the RFFE modules 309 and 319, and the RFIC module 321 in FIG. 3 perform the same operations as those included in the electronic device 200 in FIG. 2, and thus a detailed description thereof is omitted.

According to one embodiment, the diplexer 307 or 317 may be used to transmit or receive a signal in the middle frequency band and the high frequency band through one antenna. For example, a first diplexer 307 may be used to transmit and receive a signal in the middle frequency band and the high frequency band through one of the plurality of antennas 301, 303, 311, and 313. A second diplexer 317 may be used to receive a signal in the middle frequency band and the high frequency band through one of the plurality of antennas 301, 303, 311, and 313.

According to various embodiments of the present disclosure, when the electronic device includes main antennas and sub-antennas to respectively process signals in the high frequency band, the middle frequency band, and the low frequency band, the electronic device may not include any diplexer.

Figure 4:
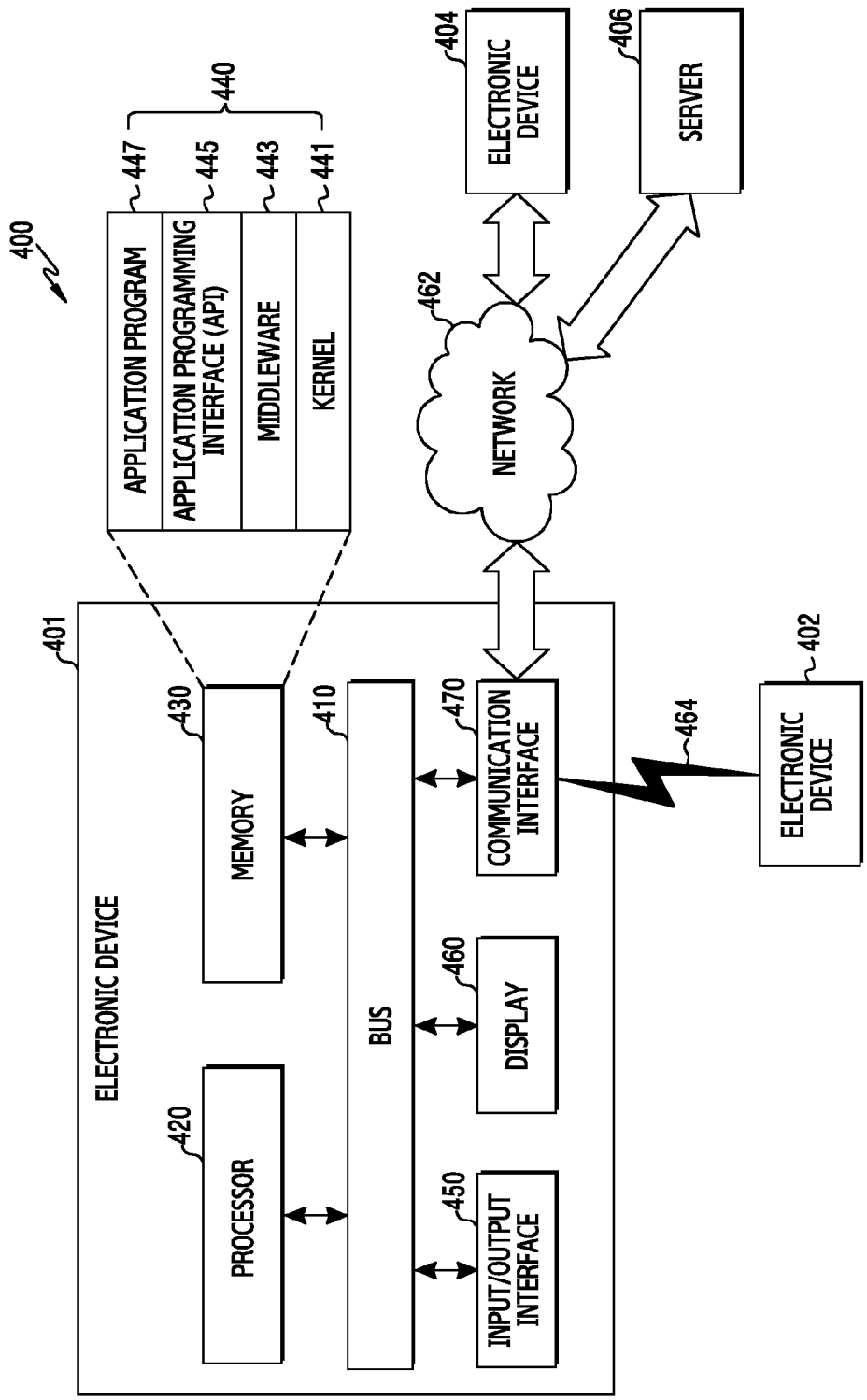
FIG. 4 illustrates an electronic device in a network environment according to various embodiments of the present disclosure.

FIG. 4 illustrates an electronic device 401 in a network environment 400 according to various embodiments of the present disclosure.

Referring to FIG. 4, the electronic device 401 may include a bus 410, a processor 420, a memory 430, an input/output interface 450, a display 460, and a communication interface 470. In some embodiments, at least one of the components may be omitted or an additional component may be further included in the electronic device 401.

The bus 410 may include, for example, a circuit that connects the components 420 to 470 to each other and delivers communications (for example, control messages and/or data) between the components.

The processor 420 may include one or more of a central processing unit (CPU), an application processor (AP), and a communication processor (CP). The processor 420 may control, for example, at least one different component of the electronic device 401 and/or may perform an operation relating to communication or data processing.

According to one embodiment, the processor 420 may control an RFIC module in the communication interface e 470 (for example, the RFIC module 221 of FIG. 2 or the RFIC module 321 of FIG. 3).

According to one embodiment, the memory 430 may store antenna characteristic information by frequency on each antenna functionally connected to the electronic device 401. For example, the antenna characteristic information may include at least one of TRP, which is the maximum power radiated through an antenna in the electronic device 401, and TIS, which is the minimum power for a base station to successfully receive a packet through an antenna with a certain probability higher.

According to one embodiment, the memory 430 may store an antenna characteristic of each antenna functionally connected to the electronic device 401 according to each frequency in each user environment.

While changing the antenna, the processor 420 can access the memory 430 using the bus 410 to retrieve characteristics of each antenna.

According to one embodiment, when communication with an external device is connected through the communication interface 470, the processor 420 may control the communication interface 470 to transmit and receive a signal using a reference antenna for a corresponding frequency band. For example, in communication with an external device through the high frequency band in FIG. 2, the processor 420 may control the communication interface 470 to transmit and receive a signal through the second antenna 203 as a main antenna and to receive a signal through the fourth antenna 213 as a sub-antenna. For example, in communication with an external device through the low frequency band or middle frequency band in FIG. 2, the processor 420 may control the communication interface 470 to transmit and receive a signal through the first antenna 201 as a main antenna and to receive a signal through the third antenna 211 as a sub-antenna. For example, the processor 420 may control the switches 205 and 215 to connect the plurality of antennas 201, 203, 211, and 213 and an internal element of the electronic device 200 according to an antenna configuration.

According to one embodiment, the processor 420 may control an antenna connection switch based on a transmission performance of the electronic device 401. For example, when the transmission power of the electronic device exceeds a threshold, the processor 420 may determine to switch a transmitting antenna of the electronic device 401. When the processor 420 determines to switch the transmitting antenna, the processor 420 may calculate a difference in reception performance (for example, Received Signal Received Power (RSRP)) between the transmitting antenna and other antennas. The processor 420 may select a new transmitting antenna based on a threshold corresponding to a characteristic (for example, the Total Radiated Power (TRP) and Total Isotropic Sensitivity (TIS)) of each antenna and a reception performance difference. For example, the processor 420 may set a difference in characteristics between the transmitting antenna and the other antennas as a threshold of each antenna for selecting a new transmitting antenna.

According to one embodiment, when the processor 420 determines to switch the transmitting antenna, the processor 420 may select a transmitting antenna based on a reception performance of at least one antenna selectable as a transmitting antenna by the electronic device 401 and a characteristic of the antenna. The processor 420 can determine the characteristic of each antenna by accessing the characteristic in the memory 430. For example, the processor 420 may select at least one antenna available as a transmitting antenna based on an available frequency band of the electronic device 401 and user environment information on the electronic device 401. For instance, the user environment information may include at least one of whether the electronic device 401 may be gripped, a grip direction (for example, a left-hand grip or right-hand grip), and whether the electronic device 401 is in proximity to the user's head.

According to one embodiment, the processor 420 may determine an antenna switch time based on whether there is data to be transmitted to another electronic device. For example, when the electronic device 401 selects a transmitting antenna for transmitting a signal, the processor 420 may determine whether to perform an antenna switch. For instance, when a transmitting antenna used for the electronic device 401 to transmit and receive data is different from a newly selected transmitting antenna, the processor 420 may determine to perform an antenna switch. When the processor 420 performs an antenna switch, the processor 420 may identify whether there is data to be transmitted to another electronic device. When there is no data to be transmitted to another electronic device (for example, a base station) for a reference time (for example, 2 ms), the processor 420 may switch the transmitting antenna. When there is data to be transmitted to another electronic device, the processor 420 may delay an antenna switch time in order to reduce data loss. For example, after the elapse of a maximum switch standby time from the time an antenna is selected, the processor 420 may switch the transmitting antenna regardless of whether there is data to be transmitted to another electronic device. For example, the processor 420 may switch the transmitting antenna by performing left/right antenna switching, up/down antenna switching, or diagonal antenna switching based on a selected transmitting antenna.

According to one embodiment, the processor 420 may determine an impedance matching mode based a transmitting antenna selected for the electronic device 401 to transmit data. For example, when the transmitting antenna of the electronic device 401 is a predefined antenna for a corresponding frequency band, the processor 420 may perform control to match the impedance of the antenna in a closed-loop mode. For instance, closed-loop antenna impedance may indicate an impedance matching mode of controlling a tuning circuit for adjusting impedance to a control value determined based on the reflection loss of the electronic device 401. For example, when the transmitting antenna of the electronic device 401 is switched from the predefined antenna to another antenna, the processor 420 may perform control to match the impedance of the antenna in an open-loop mode. For instance, open-loop antenna impedance may indicate an impedance matching mode of controlling a tuning circuit for adjusting impedance to a control value included in a predefined lookup table.

According to one embodiment, when there is no data to be transmitted to, or received from, another electronic device for a certain period of time, the processor 420 may set the transmitting antenna of the electronic device 401 as a reference antenna (main antenna).

The memory 430 may include a volatile and/or nonvolatile memory. The memory 430 may store, for example, a command or data related to at least one different component of the electronic device 401. According to one embodiment, the memory 430 may store software and/or a program 440. For example, the program 440 may include a kernel 441, a middleware 443, an application programming interface (API) 445, or an application program (or "application") 447. At least part of the kernel 441, the middleware 443, and the API 445 may be designated as an operating system (OS).

The kernel 441 may control or manage, for example, system resources (for example, the bus 410, the processor 420, the memory 430, or the like) used to perform an operation or function implemented in other programs (for example, the middleware 443, the API 445, or the application program 447). Further, the kernel 441 may provide an interface that allows the middleware 443, the API 445, or the application program 447 to access an individual component of the electronic device 401 to thereby control or manage the system resources.

The middleware 443 may serve as a relay so that, for example, the API 445 or the application program 447 communicates with the kernel 441 to exchange data. Further, the middleware 443 may process one or more requests for operations received from the application program 447 according to priority. For example, the middleware 443 may assign at least one application program 447 a priority for using a system resource (for example, the bus 410, the processor 420, the memory 430, or the like) of the electronic device 401 and may process one or more requests for operations. The API 445 is an interface for the application program 447 to control a function provided from the kernel 441 or the middleware 443 and may include, for example, at least one interface or function (for example, a command) for file control, window control, image processing, or text control.

The input/output interface 450 may serve as an interface that is capable of delivering a command or data, which is input from, for example, a user or different external device, to a different component(s) of the electronic device 401.

The display 460 may include, for example, a liquid crystal display (LCD), a light emitting diode (LED) display, an organic light emitting diode (OLED) display, a microelectromechanical systems (MEMS) display, and an electronic paper display. The display 460 may display, for example, various types of content (for example, a text, an image, a video, an icon, and/or a symbol) for the user. The display 460 may include a touch screen and may receive touch, gesture, proximity, or hovering inputs using, for example, an electronic pen or a user body part.

The communication interface 470 may establish communication, for example, between the electronic device 401 and an external device (for example, a first external electronic device 402, a second external electronic device 404, or a server 406). For example, the communication interface 470 may be connected to a network 462 via wireless communication or wire-based communication to communicate with the external device (for example, the second external electronic device 404 or the server 406).

According to one embodiment, the communication interface 470 may transmit a signal from and provide received signal to the processor 420 using a reference antenna for a corresponding frequency band. For example, in communication with an external device through the high frequency band in FIG. 2, communication interface 470 may transmit a signal from and provide received signal to the processor 420 through the second antenna 203 as a main antenna and to receive a signal through the fourth antenna 213 as a sub-antenna. For example, in communication with an external device through the low frequency band or middle frequency band in FIG. 2, the communication interface 470 may transmit a signal from and provide received signal to the processor 420 through the first antenna 201 as a main antenna and to receive a signal through the third antenna 211 as a sub-antenna.

The wireless communication may include cellular communication using, for example, at least one of Long-Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), and Global System for Mobile Communications (GSM). According to one embodiment, the wireless communication may include, for example, at least one of Wireless Fidelity (Wi-Fi), Light Fidelity (Li-Fi), Bluetooth, Bluetooth Low Energy (BLE), Zigbee, Near Field Communication (NFC), Magnetic Secure Transmission, Radio Frequency (RF), and Body Area Network (BAN). According to one embodiment, the wireless communication may include Global Navigation Satellite System (GNSS). The GNSS may be, for example, a Global Positioning System (GPS), a global navigation satellite system (Glonass), a Beidou navigation satellite system (Beidou), or the European global satellite-based navigation system (Galileo). In the present document, "GPS" may be interchangeably used with "GNSS" hereinafter. The wire-based communication may include, for example, at least one of Universal Serial Bus (USB), High Definition Multimedia Interface (HDMI), Recommended Standard-232 (RS-232), Power Line Communication, and Plain Old Telephone Service (POTS). The network 462 may include a telecommunications network, for example, at least one of a computer network (for example, a Local Area Network (LAN) or Wide Area Network (WAN)), the Internet, and a telephone network.

The first and second external electronic devices 402 and 404 may each be a device of a type that is the same as, or different from, the electronic device 401. According to various embodiments, all or part of the operations performed in the electronic device 401 may be performed in another electronic device or a plurality of electronic devices (for example, the electronic devices 402 and 404 or the server 406). According to one embodiment, when the electronic device 401 needs to perform a function or service automatically or by request, the electronic device 401 may request another electronic device (for example, the electronic device 402 or 404, or the server 406) to perform at least some functions related to the function or service, instead of, or in addition to, autonomously performing the function or service. The other electronic device (for example, the electronic device 402 or 404, or the server 406) may perform the requested functions or additional function and may transmit the result to the electronic device 401. The electronic device 401 may provide the requested function or service by using the same received result or by additionally processing the result. To this end, cloud computing, distributed computing, or client-server computing technologies may be used.

According to one embodiment, the communication interface 470 may control a connection of an antenna based on control by the processor 420. For example, as illustrated in FIG. 2, the communication interface 470 may include the antennas 201 and 203, which are disposed in the first area (for example, the lower area) of the electronic device 401, the antennas 211 and 213, which are disposed in the second area (for example, the upper area), and the switches 205 and 215 for an antenna switch. The communication interface 470 may establish a connection between the antennas 201, 203, 211, and 213 and an internal element of the electronic device 401 (for example, the diplexers 207 and 217 and the RFFE modules 209 and 219) using the first switch 205, the second switch 215, and the first path 231 and the second path 233 that connect the first switch 205 and the second switch 215.

According to one embodiment, the processor 420 may be implemented in the form of an RFIC module(for example, the RFIC module 221 of FIG. 2 or the RFIC module 321 of FIG. 3).

Figure 5:
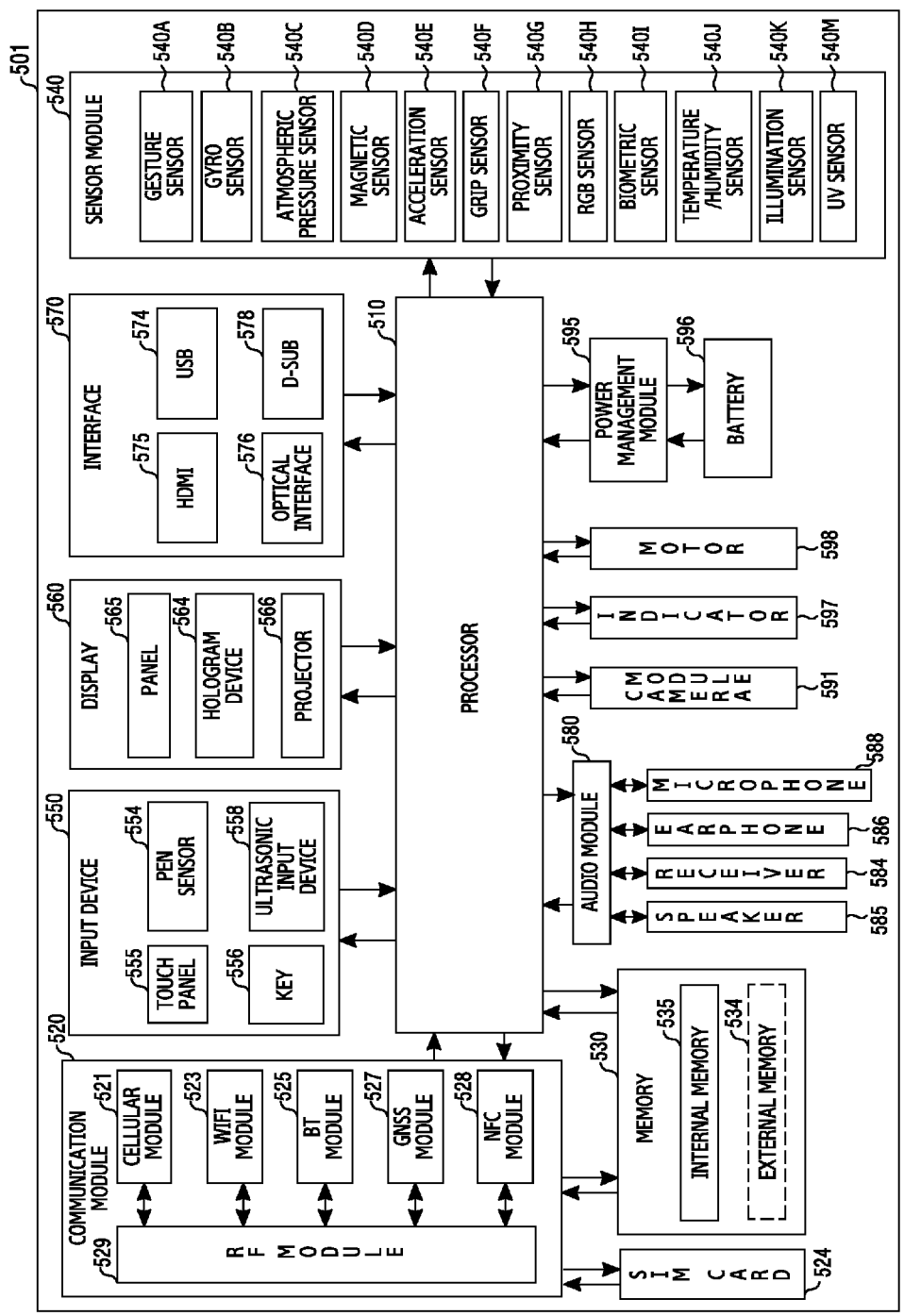
FIG. 5 is a block diagram of an electronic device according to various embodiments of the present disclosure.

FIG. 5 is a block diagram of an electronic device 501 according to various embodiments. The electronic device 501 may include, for example, the whole or part of the electronic device 401 illustrated in FIG. 4.

Referring to FIG. 5, the electronic device 501 may include one or more processors (for example, APs) 510, a communication module 520, a subscriber identification module 524, a memory 530, a sensor module 540, an input device 550, a display 560, an interface 570, an audio module 580, a camera module 591, a power management module 595, a battery 596, an indicator 597, and a motor 598.

The processors 510 may run, for example, an OS or an application program to control a plurality of hardware or software components that are connected to the processors 510 and may perform various kinds of data processing and operations. The processors 510 may be configured, for example, as a system on chip (SoC). According to one embodiment, the processors 510 may further include a graphic processing unit (GPU) and/or an image signal processor (ISP). The processors 510 may include at least part (for example, a cellular module 521) of the components illustrated in FIG. 5. The processors 510 may load a command or data received from at least one of the other components (for example, a nonvolatile memory) into a volatile memory to process the command or data and may store the resulting data in the nonvolatile memory.

The communication module 520 may have a configuration that is the same as, or similar to, that of the communication interface 470 of FIG. 4. The communication module 520 may include, for example, a cellular module 521, a Wi-Fi module 523, a Bluetooth module 525, a GNSS module 527, an NFC module 528, and an RF module 529.

The cellular module 521 may provide, for example, a voice call, a video call, a text messaging service, or an Internet service through a communication network. According to one embodiment, the cellular module 521 may perform identification and authentication of the electronic device 501 in a communication network using the subscriber identification module (for example, an SIM card) 524. According to one embodiment, the cellular module 521 may perform at least part of the functions provided by the processors 510. According to one embodiment, the cellular module 521 may include a communication processor (CP).

According to one embodiment, at least part (for example, two or more) of the cellular module 521, the Wi-Fi module 523, the Bluetooth module 525, the GNSS module 527, and the NFC module 528 may be included in one integrated chip (IC) or IC package.

The RF module 529 may transmit and receive, for example, a communication signal (for example, an RF signal). The RF module 529 may include, for example, a transceiver, a power amplifier (amp) module (PAM), a frequency filter, a low noise amplifier (LNA), an antenna, or the like. According to another embodiment, at least one of the cellular module 521, the Wi-Fi module 523, the Bluetooth module 525, the GNSS module 527, and the NFC module 528 may transmit and receive an RF signal through a separate RF module. The subscriber identification module 524 may include, for example, a card including an SIM or an embedded SIM and may include unique identification information (for example, an Integrated Circuit Card Identifier (ICCID)) or subscriber information (for example, an International Mobile Subscriber Identity (IMSI)).

According to one embodiment, the RF module 529 may control a connection and use of at least one antenna functionally connected to the electronic device 501. For example, the RF module 529 may select a transmitting antenna based on the transmission performance of the electronic device 501 and an antenna characteristic of each antenna. The RF module 529 may control a connection between the transmitting antenna and an internal element of the electronic device 501 through up/down antenna switching, left/right antenna switching, or diagonal antenna switching in order to transmit and receive a signal using the transmitting antenna.

According to one embodiment, the RF module 529 can include the circuitry of FIG. 2 or FIG. 3.

The memory 530 (for example, the memory 430 of FIG. 4) may include, for example, an internal memory 532 or an external memory 534. The internal memory 532 may include, for example, at least one of a volatile memory (for example, a Dynamic Random-Access Memory (DRAM), a Static RAM (SRAM), a Synchronous Dynamic RAM (SDRAM), or the like) and a nonvolatile memory (for example, a One-Time Programmable Read-Only Memory (OTPROM), a Programmable ROM (PROM), an Erasable And Programmable ROM (EPROM), an Electrically Erasable Programmable ROM (EEPROM), a mask ROM, a flash ROM, a flash memory, a hard drive, or a Solid State Drive (SSD)). The external memory 534 may include a flash drive, for example, a Compact Flash (CF), a Secure Digital (SD), a Micro-SD, a Mini-SD, an extreme digital (xD), a Multi-Media Card (MMC), a memory stick, or the like. The external memory 534 may be functionally or physically connected to the electronic device 501 through various interfaces.

According to one embodiment, the internal memory 535 can include characteristics of each antenna connected to the electronic device, such as antennas 201, 203, 211, 213.

The sensor module 540 may measure, for example, physical quantities or may detect an operation state of the electronic device 501 and convert measured or detected information into an electrical signal. The sensor module 540 may include, for example, at least one of a gesture sensor 540A, a gyro sensor 540B, a barometric pressure sensor 540C, a magnetic sensor 540D, an accelerometer 540E, a grip sensor 540F, a proximity sensor 540G, a color sensor 540H (for example, a red, green, and blue (RGB) sensor), a biometric sensor 540I, a temperature/humidity sensor 540J, an illumination sensor 540K, and an ultraviolet (UV) sensor 540M.

According to one embodiment, the grip sensor 540F may indicate whether the electronic device 501 is gripped, and a grip direction (for example, a left handed grip or right handed grip) to the processor 510. The proximity sensor 540G indicates whether the electronic device 501 is in proximity to the user's head to the processor 510. The processor 510 can determine whether to switch, and which antenna to select based thereon.

Additionally or alternatively, the sensor module 540 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 540 may further include a control circuit to control at least one or more sensors belonging thereto. In one embodiment, the electronic device 501 may further include a processor configured, as a part of the processors 510 or separately from the processors 510, to control the sensor module 540, thereby controlling the sensor module 540 while the processors 510 are in a sleep state. For example, the temperature/humidity sensor 540J may include a plurality of temperature sensors disposed at different positions.

The input device 550 may include, for example, a touch panel 552, a (digital) pen sensor 554, a key 556, or an ultrasonic input device 558. The touch panel 552 may use, for example, at least one of an electrostatic type, a pressure-sensitive type, an infrared type, and an ultrasonic type. Further, the touch panel 552 may further include a control circuit. The touch panel 552 may further include a tactile layer to provide a user with a tactile response. The (digital) pen sensor 554 may, for example, be part of the touch panel or include a separate recognition sheet. The key 556 may include, for example, a physical button, an optical key, or a keypad. The ultrasonic input device 558 may detect ultrasonic waves generated in an input tool through a microphone (for example, a microphone 588) and may identify data corresponding to the detected ultrasonic waves.

The display 560 (for example, the display 460 of FIG. 4) may include a panel 562, a hologram device 564, a projector 566, and/or a control circuit to control the panel 562, the hologram device 564, and the projector 566. The panel 562 may be configured, for example, to be flexible, transparent, or wearable. The panel 562 may be formed with the touch panel 552 in one or more modules. The hologram device 564 may display a three-dimensional image in the air using the interference of light. The projector 566 may project light onto a screen to display an image. The screen may be disposed, for example, inside or outside the electronic device 501. The interface 570 may include, for example, an HDMI 572, a USB 574, an optical interface 576, or a D-subminiature (D-sub) 578. The interface 570 may be included, for example, in the communication interface 470 illustrated in FIG. 4. Additionally or alternatively, the interface 570 may include, for example, a mobile high-definition link (MHL) interface, an SD card/MMC interface, or an Infrared Data Association (IrDA) interface.

The audio module 580 may convert, for example, a sound and an electrical signal reciprocally. At least some components of the audio module 580 may be included, for example, in an input/output interface 450 illustrated in FIG. 4. The audio module 580 may process sound information input or output, for example, through a speaker 582, a receiver 584, earphones 586, or the microphone 588.

The camera module 591 is a device that takes, for example, a still image and a video. According to one embodiment, the camera module 591 may include one or more image sensors (for example, a front sensor or a rear sensor), a lens, an image signal processor (ISP), or a flash (for example, an LED, a xenon lamp, or the like).

The power management module 595 may manage, for example, the power of the electronic device 501. According to one embodiment, the power management module 595 may include a power management integrated circuit (PMIC), a charger integrated circuit (IC), or a battery or fuel gauge. The PMIC may have wire-based and/or wireless charging methods. The wireless charging methods may include, for example, a magnetic resonance method, a magnetic induction method, or an electromagnetic wave method, and may further include an additional circuit for wireless charging, such as a coil loop, a resonance circuit, or a rectifier. The battery gauge may measure, for example, the remaining battery charge, the charging voltage, the current, or temperature of the battery 596. The battery 596 may include, for example, a rechargeable battery and/or a solar battery.

The indicator 597 may display a specific state of the electronic device 501 or a component thereof (for example, the processors 510), for example, a booting state, a message state, or a charging state. The motor 598 may convert an electrical signal into mechanical vibrations and may generate vibrations or a haptic effect. The electronic device 501 may include a mobile TV supporting device (for example, a GPU) that is capable of processing media data in accordance with, for example, digital multimedia broadcasting (DMB), digital video broadcasting (DVB), or mediaFlo™ standards. Each of the above-described component elements of hardware according to the present disclosure may be configured with one or more components, and the names of the corresponding component elements may vary based on the type of electronic device. According to various embodiments, the electronic device (e.g., the electronic device 501) does not include some elements or further include additional elements. Some of elements are coupled to constitute one object but the electronic device may perform the same functions as those which the corresponding elements have before being coupled to each other.

Figure 6:
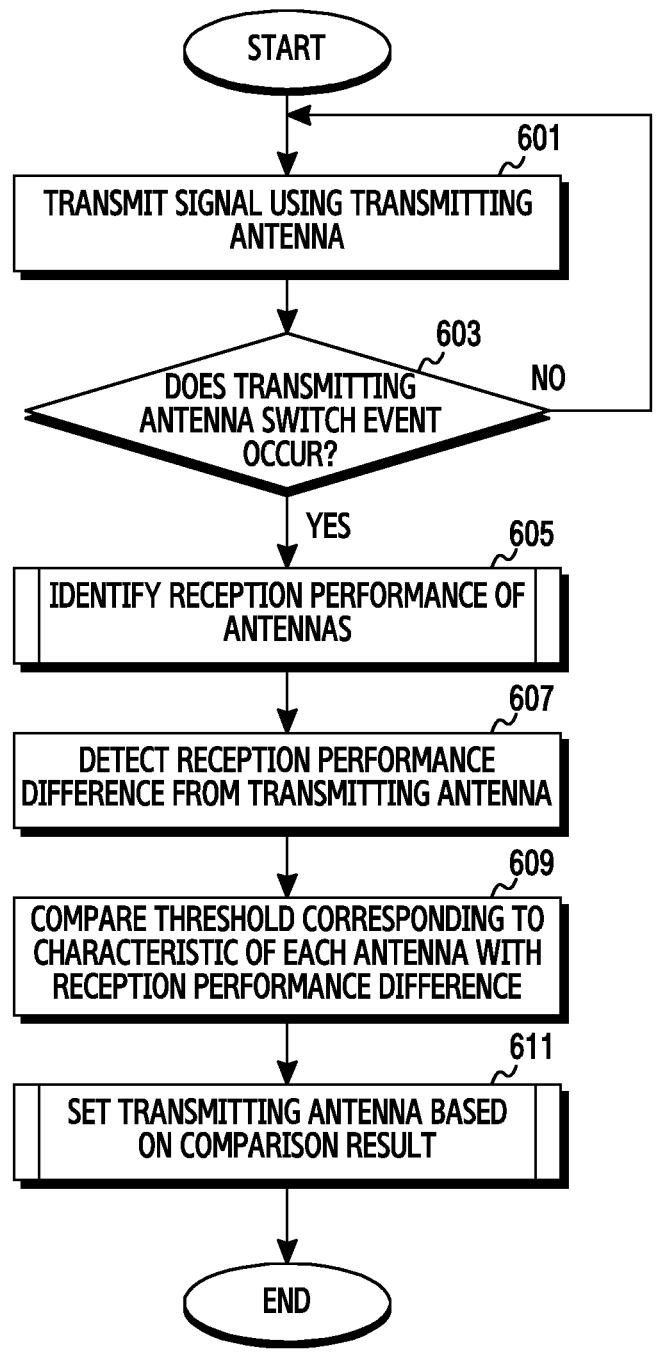
FIG. 6 is a flowchart illustrating that an electronic device configures a transmitting antenna according to various embodiments of the present disclosure.

FIG. 6 is a flowchart illustrating that an electronic device configures a transmitting antenna according to various embodiments of the present disclosure. In the following description, the electronic device may include the whole or part of the electronic device 401 illustrated in FIG. 4.

Referring to FIG. 6, in operation 601, the electronic device may transmit a signal to another electronic device using a transmitting antenna. For example, when transmitting/receiving a signal to/from the other electronic device through the high frequency band in FIG. 2, the processor 420 may use the second antenna 203 as the main antenna to transmit a signal to the other electronic device.

In operation 603, the electronic device may identify whether an event for a transmitting antenna switch occurs. For example, the processor 420 may identify whether the event for the transmitting antenna switch occurs based on the transmission power of the electronic device 401 using the transmitting antenna. For instance, when the transmission power of the electronic device 410 using the transmitting antenna is lower than a reference power (for example, x dB), the processor 420 may determine that the electronic device 401 transmits a signal in a medium electric-field or strong electric-field environment. When the transmission power of the electronic device 410 using the transmitting antenna exceeds the reference power, the processor 420 may determine that the electronic device 401 transmits a signal in a weak electric-field environment. Accordingly, when the transmission power of the electronic device 401 using the transmitting antenna exceeds the reference power, the processor 420 may determine that the event for the transmitting antenna switch occurs.

When no event for a transmitting antenna switch occurs, the electronic device may transmit a signal to the other electronic device using the transmitting antenna in operation 601.

When the event for the transmitting antenna switch occurs, the electronic device may identify a reception performance of at least one antenna functionally connected to the electronic device in operation 605. For example, when the event for the transmitting antenna switch occurs, the processor 420 may select at least one antenna available as a transmitting antenna based on an available frequency band for the electronic device 401 and user environment information on the electronic device 401. The processor 420 may identify a reception performance of each antenna available as a transmitting antenna. For example, when there is a deactivated antenna among antennas available as a transmitting antenna, the processor 420 may switch the deactivated antenna into an activated state and may identify a reception performance of the antenna. For example, a reception performance of an antenna may include at least one of a Receiver Signal Strength Indicator (RSSI), Reference Signal Received Power (RSRP), and Reference Signal Received Quality (RSRQ).

In operation 607, the electronic device may detect a difference in the reception performance of the other antennas based on the reception performance of the transmitting antenna. For example, the processor 420 may detect a difference in reception performance between the transmitting antenna, which is occupied by the electronic device 401 to transmit a signal, and each different antenna.

In operation 609, the electronic device may compare a threshold of each antenna corresponding to an antenna characteristic with the reception performance difference. The processor 420 can access the characteristics of each antenna from memory 430. For example, due to differences in hardware performance, each of the antennas available as a transmitting antenna for the electronic device may have a different characteristic (for example, TRP and TIS) in each frequency band. Accordingly, the electronic device may set a relatively high threshold of each antenna for an antenna switch so as to reduce the probability of a switch of the transmitting antenna to an antenna with a greater TRP difference between antennas. For example, the electronic device 200 has a relationship in antenna TRP value of $TRP_1 > TRP_2 > TRP_3 > TRP_4$, in which when the first antenna 201 is configured as a transmitting antenna, the other antennas 203, 211, and 213 may have a relationship in threshold of $threshold_{12} < threshold_{13} < threshold_{14}$. For example, a threshold may be set based on a difference in TRP value between the transmitting antenna and each antenna selectable for the electronic device.

In operation 611, the electronic device may select an antenna to be used as a transmitting antenna for the electronic device based on a result of comparing the threshold of each antenna and the reception performance difference. For example, the processor 420 may select an antenna with a reception performance difference from the transmitting antenna being greater than the threshold of the antenna as a transmitting antenna to be used for the electronic device. Additionally or alternatively, when there is a plurality of antennas with a reception performance difference from the transmitting antenna being greater than the thresholds of the antennas, the processor 420 may select an antenna with the greatest antenna switch gain as a transmitting antenna to be used for the electronic device. For example, the antenna switch gain may be determined based on a difference between the reception performance difference from the transmitting antenna and the threshold of the antenna. Additionally or alternatively, when the antenna switch gain of an antenna selected to be used as a transmitting antenna for the electronic device exceeds that of a threshold gain, the processor 420 may perform control to switch the transmitting antenna. For example, the reference gain may include a set value (for example, x dB) for hysteresis.

According to various embodiments of the present disclosure, the electronic device may set the threshold of an antenna for an antenna switch based on the TRP and TIS of the antenna. For example, the threshold of the antenna may be set based on a difference in TRP between the transmitting antenna and each antenna selectable for the electronic device and a difference in TIS between the transmitting antenna and each antenna selectable for the electronic device.

Figure 7:
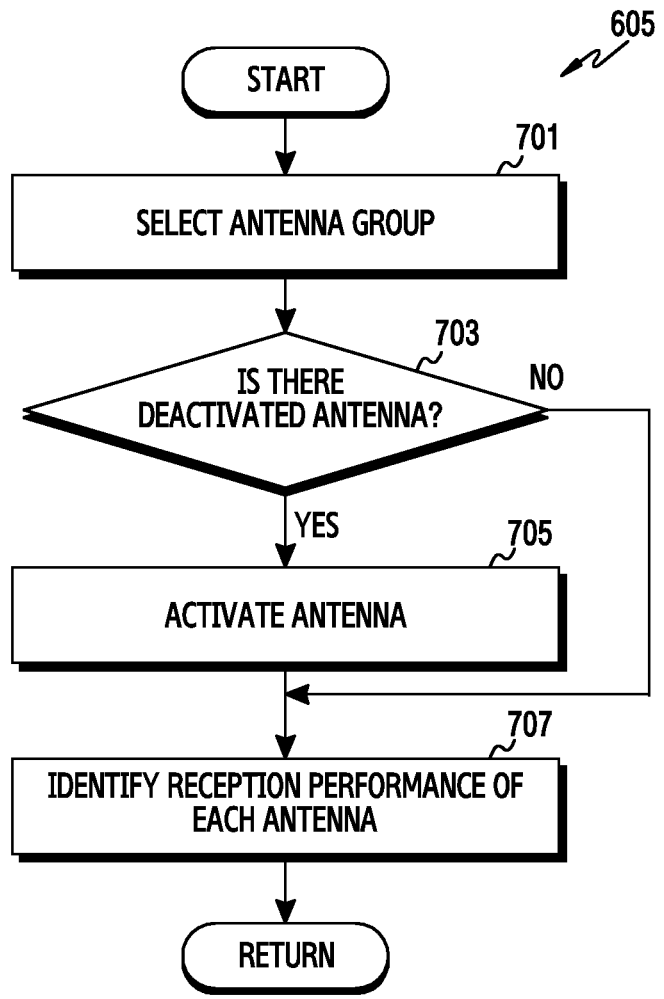
FIG. 7 is a flowchart illustrating that an electronic device identifies a reception performance of an antenna according to various embodiments of the present disclosure.

FIG. 7 is a flowchart illustrating that an electronic device identifies a reception performance of an antenna according to various embodiments of the present disclosure. The following description illustrates an operation of identifying reception performances of antennas as in operation 605 of FIG. 6. In the following description, the electronic device may include the whole or part of the electronic device 401 illustrated in FIG. 4.

Referring to FIG. 7, in operation 701, when the occurrence of an event for a transmitting antenna switch is detected (for example, operation 603 in operation FIG. 6), the electronic device may select an antenna group including at least one antenna selectable as a transmitting antenna for the electronic device in operation 701. For example, when the electronic device 401 transmits/receives a signal to/from another electronic device through the low frequency band, the processor 420 may select the first antenna 201 and the third antenna 211 of FIG. 2 as at least one antenna selectable as a transmitting antenna. For example, when the electronic device 401 transmits/receives a signal to/from another electronic device through the middle frequency band or the high frequency band, the processor 420 may select the first antenna 201, the second antenna 203, the third antenna 211, and the fourth antenna 213 of FIG. 2 as at least one antenna selectable as a transmitting antenna. For example, when the proximity sensor 540G detects that the electronic device 501 is close to the user's head for a voice call, the processor 420 may select the first antenna 201 and the second antenna 203 of FIG. 2 as at least one antenna selectable as a transmitting antenna in view of the Specific Absorption Rate (SAR).

In operation 703, the electronic device may identify whether there is a deactivated antenna among the at least one antenna selectable as the transmitting antenna.

When there is no deactivated antenna, the electronic device may identify a reception performance of each antenna in operation 707. For example, the reception performance of the antenna may include at least one of the Signal-to-Interference and Noise Ratio (SINR), RSRP, and RSRQ.

When there is a deactivated antenna among the at least one antenna selectable as the transmitting antenna, the electronic device may activate the deactivated antenna in operation 705. For example, the processor 420 may control a reception path (Rx path) of the deactivated antenna to be activated.

In operation 707, the electronic device may identify a reception performance of each at least one antenna selectable as a transmitting antenna.

Figure 8:
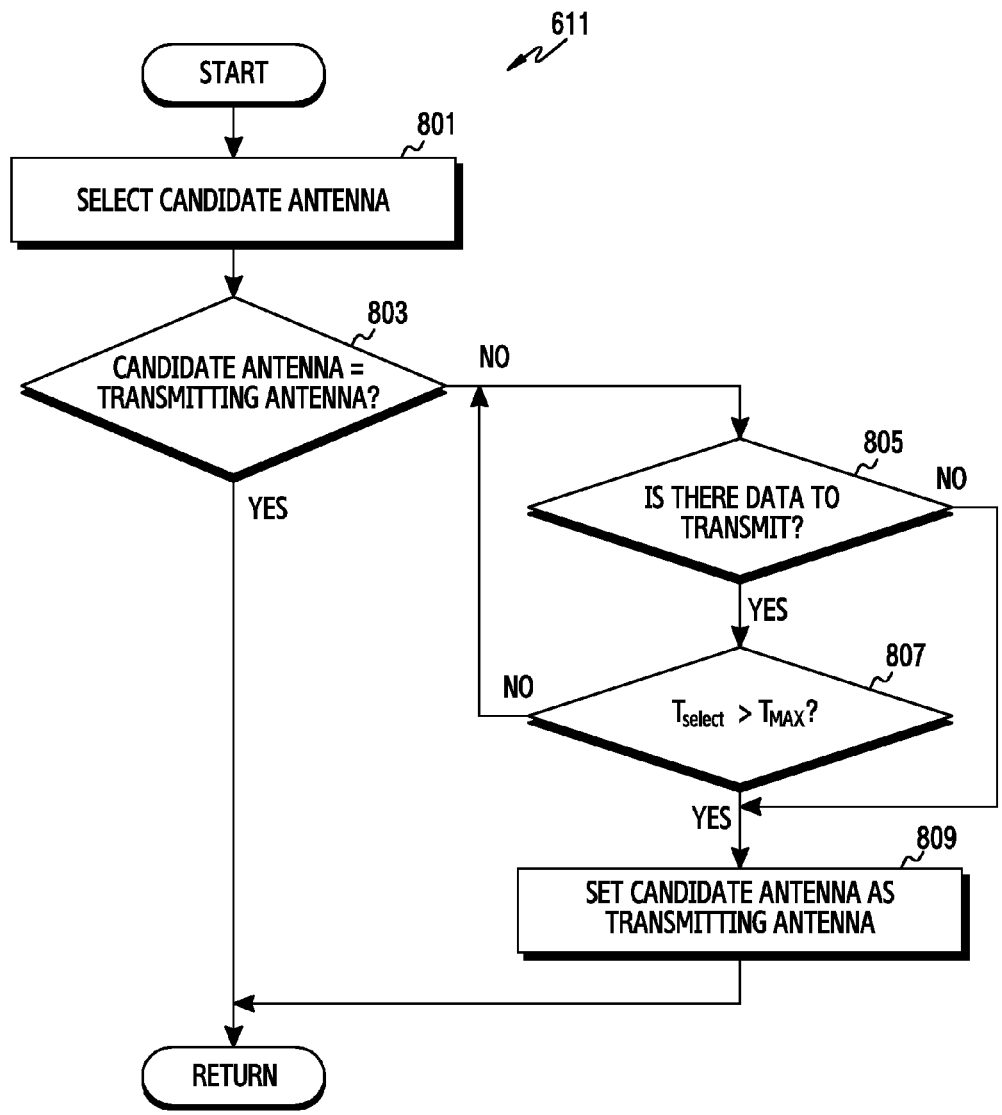
FIG. 8 is a flowchart illustrating that an electronic device switches a transmitting antenna according to various embodiments of the present disclosure.

FIG. 8 is a flowchart illustrating that an electronic device switches a transmitting antenna according to various embodiments of the present disclosure. The following description illustrates an operation of configuring a transmitting antenna as in operation 611 of FIG. 6. In the following description, the electronic device may include the whole or part of the electronic device 401 illustrated in FIG. 4.

Referring to FIG. 8, when the electronic device compares a threshold of each antenna corresponding to an antenna characteristic with a reception performance difference (for example, operation 609 of FIG. 6), the electronic device may select a candidate antenna to be used as a transmitting antenna for the electronic device based on a comparison result in operation 801. For example, the processor 420 may access antenna characteristics from memory 430 and select, as a candidate antenna, an antenna with a reception performance difference from the transmitting antenna that exceeds a threshold set based on the retrieved antenna characteristic (for example, TRP and TIS), among at least one antenna selectable as a transmitting antenna. For example, when there are a plurality of antennas with a reception performance difference from the transmitting antenna that exceeds a threshold set based on an antenna characteristic (for example, TRP and TIS), the processor 420 may select an antenna with the greatest antenna switch gain as a candidate antenna.

In operation 803, the electronic device may identify whether the transmitting antenna currently used for the electronic device is the same as the candidate antenna. For example, when the transmitting antenna currently used for the electronic device is the same as the candidate antenna, the electronic device may transmit a signal through the transmitting antenna, without performing an antenna switch.

When the transmitting antenna currently used for the electronic device is different from the candidate antenna, the electronic device may identify whether there is data to transmit to another electronic device in operation 805. To maintain continuity in data/voice transmission, it may be advantageous to bias the timing of the antenna change to times where there is no data to transmit. For example, the processor 420 may determine an antenna switch time based on the presence of data to transmit in order to reduce the loss of data to be transmitted from the electronic device 401 to the other electronic device, which occurs by a transmitting antenna switch. Therefore, if there is data to transmit at 805, processor 420 determines whether an elapsed time ($T_{select}$) from the time the candidate antenna is selected exceeds a maximum switch standby time ($T_{max}$, for example, 1 s) in operation 807.

When the elapsed time from the time the candidate antenna is selected is less than the maximum switch standby time, the electronic device may identify again whether there is data to transmit to another electronic device in operation 805. Operations 805 to 807 are repeated until either there is no data to transmit or $T_{select} > T_{max}$.

When there is no data to transmit to another electronic device, or $T_{select} > T_{max}$, the electronic device may set the candidate antenna as a transmitting antenna in operation 809. For example, the processor 420 may switch the transmitting antenna of the electronic device 401 to the candidate antenna through left/right antenna switching, up/down antenna switching, or diagonal antenna switching. For instance, when there is no data to transmit to another electronic device for a reference time (for example, 2 ms), the processor 420 may set the candidate antenna as a transmitting antenna. When the elapsed time from the time the candidate antenna is selected exceeds the maximum switch standby time, the electronic device may set the candidate antenna as a transmitting antenna in operation 809.

Figure 9:
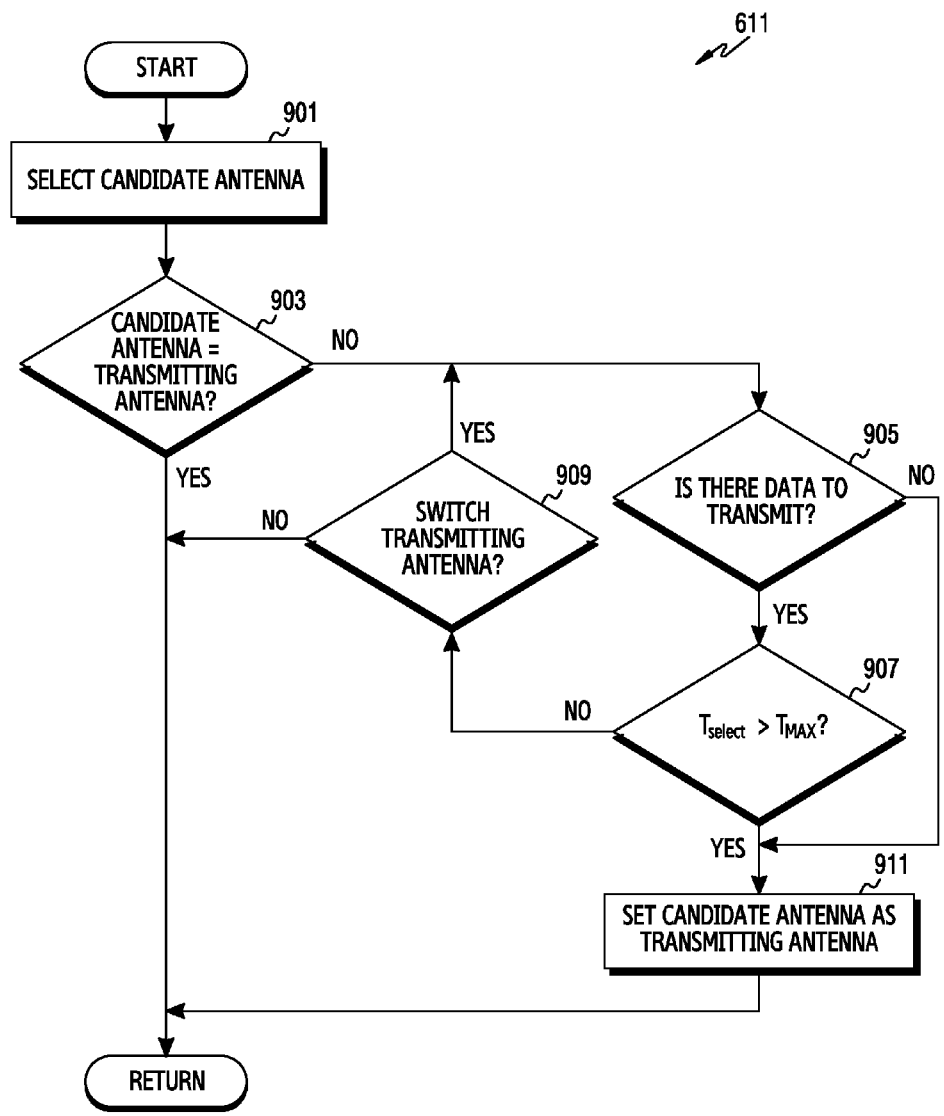
FIG. 9 is a flowchart illustrating that an electronic device selectively switches a transmitting antenna according to various embodiments of the present disclosure.

FIG. 9 is a flowchart illustrating that an electronic device selectively switches a transmitting antenna according to various embodiments of the present disclosure. The following description illustrates an operation of configuring a transmitting antenna as in operation 611 of FIG. 6. In the following description, the electronic device may include the whole or part of the electronic device 401 illustrated in FIG. 4. In addition to biasing the switching timing to more likely occur when there is no data to be transmitted, the flowchart rechecks whether the transmitting antenna switch event occurs during each iteration.

Referring to FIG. 9, when the electronic device compares a threshold of each antenna corresponding to an antenna characteristic with a reception performance difference (for example, operation 609 of FIG. 6), the electronic device may select a candidate antenna to be used as a transmitting antenna for the electronic device based on a comparison result in operation 901. For example, the processor 420 may retrieve characteristics of each antenna from memory 430 and may select a candidate antenna by comparing a threshold corresponding to a characteristic (for example, TRP and TIS) of an antenna selectable as a transmitting antenna with a reception performance difference from the transmitting antenna. For example, when there are a plurality of antennas satisfying a transmitting antenna selection criterion, the processor 420 may select an antenna with the greatest antenna switch gain as a candidate antenna among the antennas satisfying the transmitting antenna selection criterion. For instance, when a difference in reception performance between the transmitting antenna and another antenna exceeds a threshold set based on a characteristic (for example, TRP and TIS) of the other antenna, the processor 420 may determine that the other antenna satisfies the transmitting antenna selection criterion.

In operation 903, the electronic device may identify whether the transmitting antenna occupied by the electronic device to transmit a signal to another electronic device is the same as the candidate antenna. For example, when the transmitting antenna of the electronic device is the same as the candidate antenna, the electronic device may use the transmitting antenna of the electronic device to transmit a signal to the other electronic device (for example, operation 601 in FIG. 6).

When the transmitting antenna of the electronic device is different from the candidate antenna, the electronic device may identify whether there is data to transmit to another electronic device in operation 905. To maintain continuity of data transmission, the processor 420 may bias the timing of the switch to be more likely when there is no data to transmit. The processor 420 may bias the timing of the switch to be more likely when there is no data to transmit by only switching antennas when there is data to transmit under certain conditions.

When there is no data to transmit to another electronic device, the electronic device may set the candidate antenna as a transmitting antenna for the electronic device in operation 911. For example, the processor 420 may perform control to connect the candidate antenna to the main RFFE module 209 by performing left/right antenna switching, up/down antenna switching, or diagonal antenna switching using the switches 205 and 215 of FIG. 2 in order to set the candidate antenna as a transmitting antenna for the electronic device. Additionally or alternatively, when there is no data to transmit to another electronic device for a reference time (for example, 2 ms), the processor 420 may set the candidate antenna as a transmitting antenna.

When there is data to transmit to another electronic device, the electronic device may identify whether an elapsed time ($T_{select}$) from the time the candidate antenna is selected exceeds a maximum switch standby time ($T_{max}$, for example, 1 s) ($T_{select} > T_{max}$) in operation 907.

When the elapsed time from the time the candidate antenna is selected is less than the maximum switch standby time, the electronic device may determine whether the transmitting antenna has been switched in operation 909. For example, when the occurrence of the event for the transmitting antenna switch detected in operation 603 is ended, the processor 420 may determine that the transmitting antenna has not been switched. Specifically, when the electronic device 401 is gripped by the user, the processor 420 may determine that an event for a transmitting antenna switch occurs. When the user's grip is released while determining a time to switch to the candidate antenna, the processor 420 may determine that the transmitting antenna has not been switched.

When it is determined that the transmitting antenna has not been switched, the electronic device may transmit a signal to another electronic device using the transmitting antenna of the electronic device, aborting the antenna switch (for example, operation 601 in FIG. 6). For example, when it is determined that the transmitting antenna switch event is no longer occurring, the processor 420 may control the communication interface 470 to transmit a signal to another electronic device using the transmitting antenna of the electronic device.

When it is determined that the transmitting antenna has been switched, the electronic device may identify again whether there is data to transmit to another electronic device.

When the elapsed time from the time the candidate antenna is selected exceeds the maximum switch standby time, the electronic device may set the candidate antenna as a transmitting antenna in operation 911.

Figure 10:
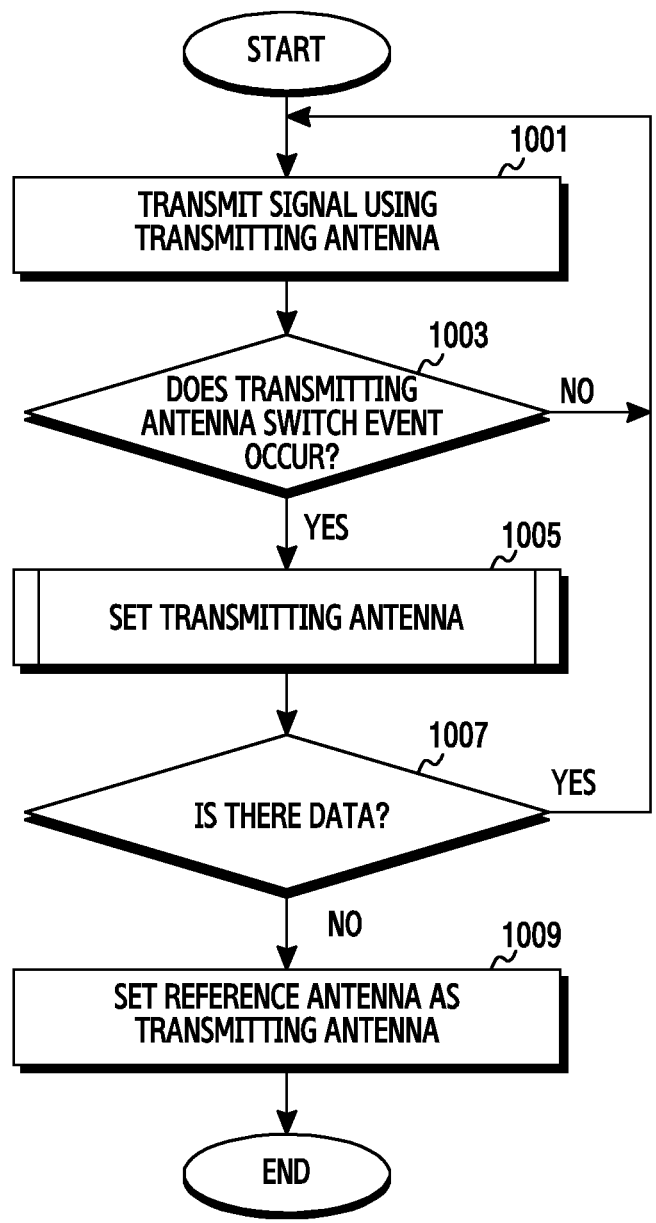
FIG. 10 is a flowchart illustrating that an electronic device configures a reference antenna as a transmitting antenna according to various embodiments of the present disclosure.

FIG. 10 is a flowchart illustrating that an electronic device configures a reference antenna as a transmitting antenna according to various embodiments of the present disclosure. In FIG. 10, the reference antenna is set as the transmitting antenna, only when there is no data to be transmitted. In the following description, the electronic device may include the whole or part of the electronic device 401 illustrated in FIG. 4.

Referring to FIG. 10, the electronic device may transmit a signal to another electronic device using a transmitting antenna in operation 1001. For example, when transmitting/receiving a signal to/from another electronic device through the middle frequency band in FIG. 2, the processor 420 may use the first antenna 201 as the main antenna to transmit a signal to the other electronic device.

In operation 1003, the electronic device may identify whether an event for a transmitting antenna switch occurs. For example, when the transmission power of the electronic device 401 using the transmitting antenna exceeds a threshold power, the processor 420 may determine that an event for a transmitting antenna switch occurs.

When no event for a transmitting antenna switch occurs, the electronic device may keep transmitting a signal using the transmitting antenna in operation 1001.

When an event for a transmitting antenna switch occurs, the electronic device may set a transmitting antenna by comparing a threshold of each antenna corresponding to a characteristic of the antenna with a difference in reception performance between the antenna and the transmitting antenna in operation 1005. For example, the processor 420 may set a transmitting antenna according to the operation 605 to operation 611 of FIG. 6.

In operation 1007, the electronic device may identify whether there is data to transmit to/receive from another electronic device. For example, the processor 420 may identify whether there is no data to transmit to/receive from another electronic device for a certain period of time (for example, hundreds of milliseconds (ms) to several seconds) so that the electronic device enters a data inactivity state.

When there is data to transmit to/receive from another electronic device, the electronic device may transmit a signal to the other electronic device through the transmitting antenna in operation 1001. For example, when the electronic device is not in the data inactivity state, the processor 420 may transmit a signal to the other electronic device through the transmitting antenna. It is noted that another transmitting antenna switch event must occur at 1003 before returning to operation 1007.

When there is no data to transmit to/receive from another electronic device for a certain period of time, the electronic device may set a reference antenna for a corresponding frequency band as a transmitting antenna for the electronic device in operation 1009. For example, when an operating frequency of the electronic device 401 is included in the low frequency band, the processor 420 may set, as a transmitting antenna for the electronic device 401, the first antenna 201 as the reference antenna for the low frequency band by performing left/right antenna switching, up/down antenna switching, or diagonal antenna switching.

Figure 11:
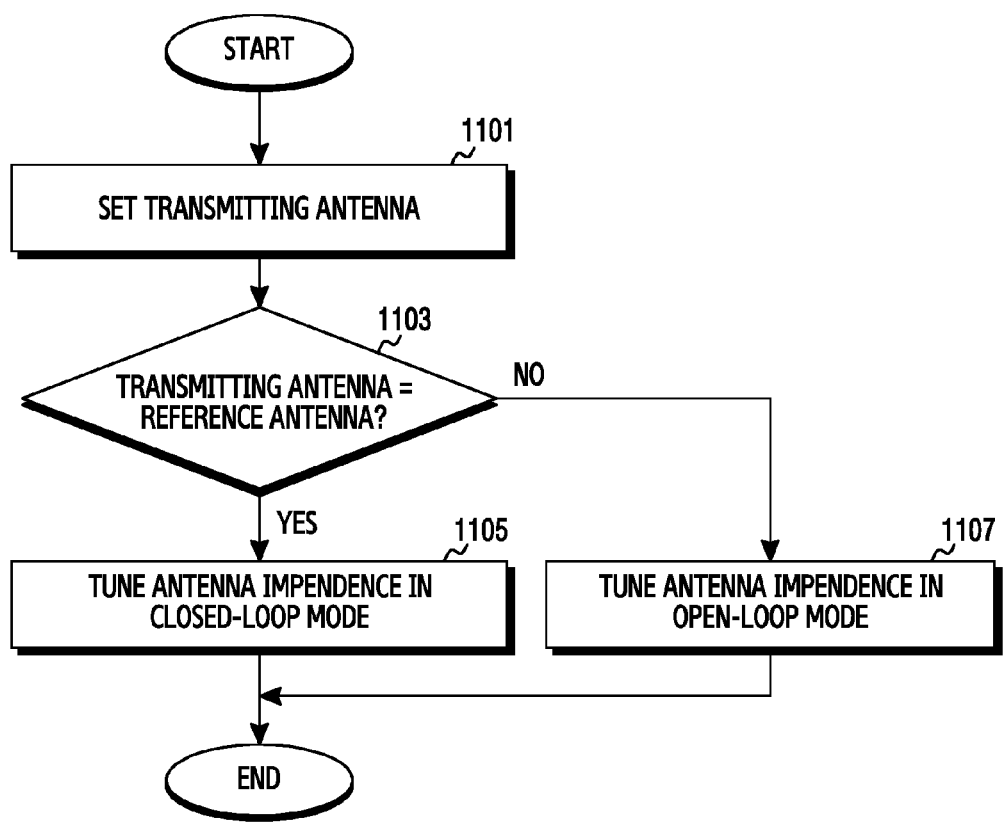
FIG. 11 is a flowchart illustrating that an electronic device performs antenna impedance tuning according to various embodiments of the present disclosure.

FIG. 11 is a flowchart illustrating that an electronic device performs antenna impedance tuning according to various embodiments of the present disclosure. In the following description, the electronic device may include the whole or part of the electronic device 401 illustrated in FIG. 4.

Referring to FIG. 11, the electronic device may set a transmitting antenna to be used to transmit a signal to another electronic device in operation 1101. For example, the processor 420 may set a transmitting antenna for the electronic device 401 by comparing a threshold of each antenna corresponding to a characteristic of the antenna with a difference in reception performance between the antenna and the transmitting antenna as in operation 605 to operation 611 of FIG. 6.

In operation 1103, the electronic device may identify whether the transmitting antenna of the electronic device is the same as a reference antenna for an operating frequency of the electronic device. For example, when the operating frequency of the electronic device is the low frequency band or middle frequency band, the processor 420 may determine the first antenna 201 of FIG. 2 as a reference antenna. When the operating frequency of the electronic device is the high frequency band, the processor 420 may determine the second antenna 203 of FIG. 2 as a reference antenna.

When the transmitting antenna of the electronic device is the same as the reference antenna for the operating frequency of the electronic device, the electronic device may match the impedance of the antenna in the closed-loop mode in operation 1105. For example, when the reference antenna for the operating frequency of the electronic device is set as the transmitting antenna for the electronic device, the processor 420 may determine that the transmitting antenna of the electronic device includes a tuning circuit for the operating frequency of the electronic device. Accordingly, the processor 420 may perform control to match the impedance of the antenna using the tuning circuit included in the transmitting antenna.

When the transmitting antenna of the electronic device is different from the reference antenna for the operating frequency of the electronic device, the electronic device may match the impedance of the antenna in the open-loop mode in operation 1107. For example, when the reference antenna for the operating frequency of the electronic device is different from the transmitting antenna of the electronic device, the processor 420 may determine that the transmitting antenna includes no tuning circuit for the operating frequency of the electronic device. Accordingly, the processor 420 may perform control to match the impedance of the antenna in the open-loop mode.

According to various embodiments of the present disclosure, when the electronic device stores antenna characteristic information (for example, TRP and TIS) on each antenna corresponding user environment information in the memory, the electronic device may set a threshold of each antenna for an antenna switch based on an antenna characteristic corresponding to a user environment at the time an event for a transmitting antenna switch occurs.

According to various embodiments of the present disclosure, the electronic device may use a plurality of transmitting antennas as in uplink carrier aggregation (CA) or a multi-antenna transmission mode (for example, Multiple Input Multiple Output (MIMO)). In this case, the electronic device may select an antenna to independently switch each transmitting antenna. For example, the electronic device may set a difference in antenna characteristic between each transmitting antenna and another selectable antenna as a threshold for an antenna switch of each transmitting antenna.

An electronic device and an operating method thereof according to various embodiments may switch a connection between a plurality of antennas functionally connected to the electronic device using two switches for antenna switching and two paths connecting the switches, thereby selecting a transmitting antenna for the electronic device by using the plurality of antennas of the electronic device.

An electronic device and an operating method thereof according to various embodiments may set a threshold for selecting a transmitting antenna based on antenna characteristic (for example, TRP and TIS) of each of a plurality of antennas functionally connected to the electronic device, thereby providing optimal communication quality for the user of the electronic device.

The term "module" as used herein may, for example, mean a unit including hardware, or a combination of hardware programmed with software, and/or firmware.

The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command or a plurality of commands or executable instructions stored in a computer-readable storage medium in a program module form. The instruction, when executed by one or more processor (e.g., the processor 420), may cause the one or more processors to execute the function corresponding to the plurality of instructions. The computer-readable storage medium may be, for example, the memory 430.

The computer readable recoding medium may include a hard disk, a floppy disk, magnetic media (for example, a magnetic tape), optical media (for example, a Compact Disc Read Only Memory (CD-ROM) and a Digital Versatile Disc (DVD)), magneto-optical media (for example, a floptical disk), a hardware device (for example, a Read Only Memory (ROM), a Random Access Memory (RAM), a flash memory), and the like. In addition, the program instructions may include high class language codes, which can be executed in a computer by using an interpreter, as well as machine codes made by a compiler. Any of the hardware devices as described above may be configured to work as one or more software modules in order to perform the operations according to various embodiments of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

The embodiments disclosed herein are provided merely to easily describe technical details of the present disclosure and to help the understanding of the present disclosure, and are not intended to limit the scope of various embodiments of the present disclosure. Therefore, it should be construed that all modifications and changes or various other embodiments based on the technical idea of various embodiments of the present disclosure fall within the scope of various embodiments of the present disclosure.

What is claimed is:

1. An electronic device comprising:
   a plurality of antennas;
   a communication circuit configured to be connected with the plurality of antennas; and
   at least one processor, wherein the processor is configured to:
   control the communication circuit to transmit a signal to an external device through a first antenna of the plurality of antennas;
   detect a difference in reception performance between the first antenna and each remaining antenna of the plurality of antennas in response to occurrence of an event;
   identify a threshold corresponding to an antenna characteristic of each of the at least one remaining antenna, each of the antenna characteristics comprising at least one of a total radiated power (TRP) and total isotropic sensitivity (TIS);
   compare the threshold corresponding to the antenna characteristic of each of the at least one remaining antenna and the difference in reception performance of each of the at least one remaining antenna;
   select one among the plurality of antennas as a transmitting antenna for the electronic device based on the compared result; and
   switch to the selected antenna as the transmitting antenna for the electronic device.

2. The electronic device of claim 1, wherein the plurality of antennas comprises a plurality of antennas disposed in a first area of the electronic device and at least one antenna disposed in a second area of the electronic device.

3. The electronic device of claim 2, further comprising:
   a first switch disposed on an electrical path connecting the plurality of antenna disposed in the first area and the communication circuit; and
   a second switch disposed on an electronic path connecting the at least one antenna disposed in the second area and the communication circuit,
   wherein the first switch and the second switch are configured to connect the plurality of antenna disposed in the first area and the communication circuit and to connect the at least one antenna disposed in the second area and the communication circuit using a first electrical path and a second electrical path that connect the first switch and the second switch.

4. The electronic device of claim 3, wherein the first switch comprises one more pole and one more throw than a number of the plurality of antennas disposed in the first area, and the second switch comprises one more pole and one more throw than a number of the at least one antenna disposed in the second area.

5. The electronic device of claim 2, wherein the first area comprises one of a lower area and an upper area of the electronic device, and the second area comprises the other of the upper area and the lower area of the electronic device.

6. The electronic device of claim 1, wherein the processor is configured to select at least one antenna selectable as the transmitting antenna for the electronic device of the plurality of antennas in response to the occurrence of the event and to detect a reception performance of each of the selected at least one antenna,
    wherein the reception performance comprises at least one of a Signal-to-Interference and Noise Ratio (SINR), a Receiver Signal Strength Indicator (RSSI), a Reference Signal Received Power (RSRP), and a Reference Signal Received Quality (RSRQ).

7. The electronic device of claim 1, wherein the processor is configured to set a difference in antenna characteristic between the first antenna and the remaining antenna of the plurality of antennas as a threshold of the remaining antenna of the plurality of antennas.

8. The electronic device of claim 1, wherein when there is no data transmitted and received by the electronic device, the processor is configured to set, as the transmitting antenna for the electronic device, an antenna predefined as a transmitting antenna for an operating frequency of the electronic device.

9. The electronic device of claim 1, wherein the processor is configured to tune antenna impendence in a closed-loop mode or open-loop mode based on a connection configuration of the selected antenna.

10. An operating method of an electronic device, the method comprising:
    transmitting a signal to an external device through a first antenna of a plurality of antennas operatively connected to the electronic device;
    detecting a difference in reception performance between the first antenna of the plurality of antennas and each remaining antenna of the plurality of antennas in response to occurrence of an event;
    identifying a threshold corresponding to an antenna characteristic of each of the at least one remaining antenna, each of the antenna characteristics comprising at least one of a Total Radiated Power (TRP) and Total Isotropic Sensitivity (TIS);
    comparing the threshold corresponding to the antenna characteristic of each of the at least one remaining antenna and the difference in reception performance of each of the at least one remaining antenna
    selecting one among the plurality of antennas as a transmitting antenna for the electronic device based on the compared result; and
    switching to the selected antenna as the transmitting antenna for the electronic device.

11. The method of claim 10, wherein the detecting of the difference in reception performance comprises:
    selecting at least one antenna selectable as the transmitting antenna for the electronic device of the plurality of antennas in response to the occurrence of the event;
    detecting a reception performance of each of the selected at least one antenna; and
    calculating the difference in reception performance of the first antenna and each of the selected at least one antenna.

12. The method of claim 11, wherein the selecting of the at least one antenna comprises selecting at least one antenna selectable as the transmitting antenna for the electronic device based on an operating frequency of the electronic device, whether the electronic device is gripped, a grip direction of the electronic device, and information on proximity of the electronic device to a user's head.

13. The method of claim 10, wherein a reception performance of the antenna comprises at least one of a Signal-to-Interference and Noise Ratio (SINR), a Receiver Signal Strength Indicator (RSSI), a Reference Signal Received Power (RSRP), and a Reference Signal Received Quality (RSRQ).

14. The method of claim 10, wherein the switching of the transmitting antenna comprises setting the selected antenna as the transmitting antenna for the electronic device through left/right antenna switching, up/down antenna switching, or diagonal antenna switching.

15. The method of claim 10, wherein the switching of the transmitting antenna comprises:
    identifying whether there is data to transmit from the electronic device to another electronic device; and
    switching to the selected antenna as the transmitting antenna for the electronic device when there is no data for a reference time.

16. The method of claim 10, further comprising setting, as the transmitting antenna for the electronic device, an antenna predefined as a transmitting antenna for an operating frequency of the electronic device, when there is no data transmitted and received by the electronic device.

17. The method of claim 10, further comprising tuning antenna impendence in a closed-loop mode or open-loop mode based on a connection configuration of the selected antenna.

\* \* \* \* \*